March 16, 1926.

A. A. JEANERET 1,576,873

OPHTHALMIC MOUNTING

Filed March 11, 1924

Inventor:
Albert A. Jeaneret
by David Rines
Attorney;-

Patented Mar. 16, 1926.

1,576,873

UNITED STATES PATENT OFFICE.

ALBERT A. JEANERET, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed March 11, 1924. Serial No. 698,384.

*To all whom it may concern:*

Be it known that I, ALBERT A. JEANERET, a citizen of the United States, and a resident of Providence, in the county of Providence and State of Rhode Island, have invented new and useful Improvements in Ophthalmic Mountings, of which the following is a specification.

The present invention relates to ophthalmic mountings, and more particularly to spectacles of the "all-shell" type.

Spectacles of the above-described character comprise lens-holding rims, a bridge and temple end pieces all integrally connected together and constituted of some non-metallic material, such as zylonite, horn, tortoise shell and the like. The spectacles are provided with temples constituted of like material that are hinged to the end pieces. The temples are provided with ear-engaging or skull-engaging hooks. When the temples are folded, these hooks project to one side of the rims. A folded pair of spectacles of the "all-shell" type is therefore bulky, and requires a large spectacle case. As the non-metallic material is not easily flexible, any attempt to force the hooks to overlie the rims will result in weakening the hinge connections between the temples and the end pieces; so that the bulky cases have been conceded to be a necessary evil.

In a copending application, Serial No. 694,984 filed February 25, 1924, there is disclosed an ophthalmic mounting that is foldable in compact shape, making it possible to use a smaller spectacle case. The object of the present invention is to improve upon the ophthalmic mounting therein illustrated and described.

With this end in view, the invention consists of the improved ophthalmic mounting hereinafter described, illustrated in the accompanying drawings, and defined in the appended claims.

Figure 1:
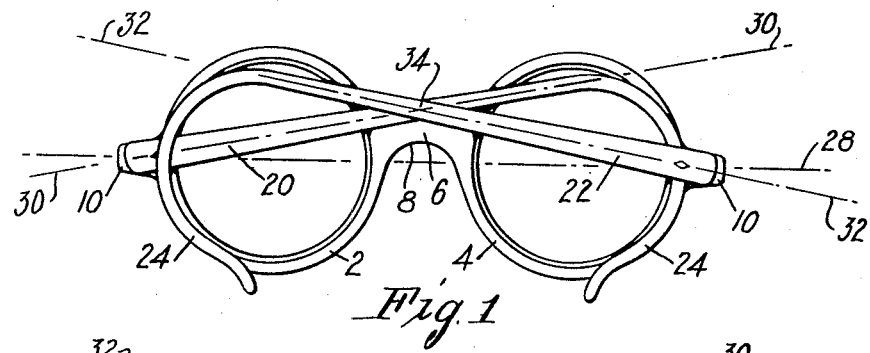
Figure 2:
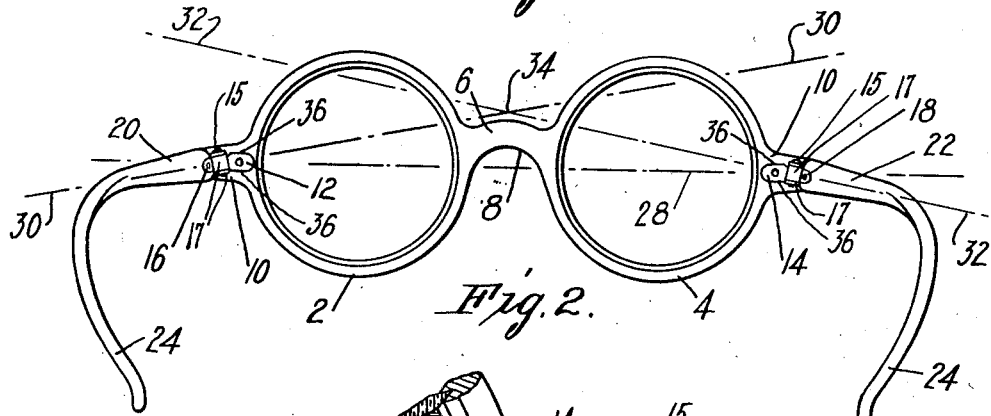
Figure 3:
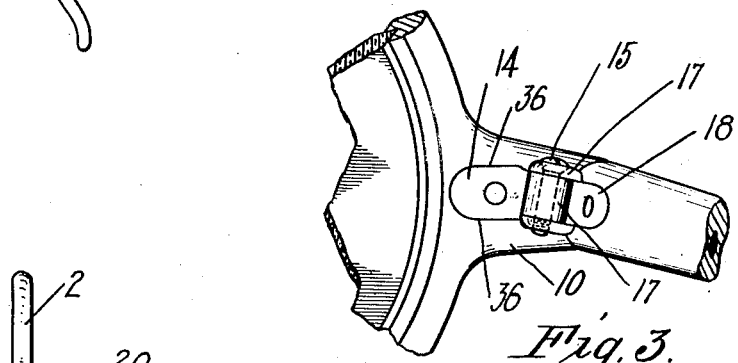
Figure 4:
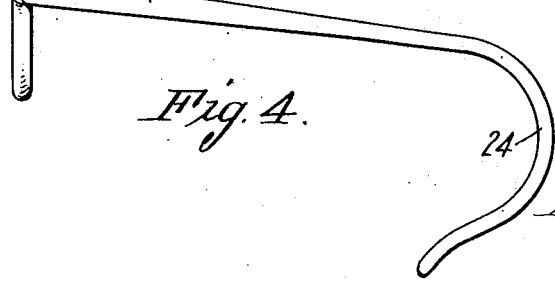

In the drawings, Fig. 1 is a rear elevation of a pair of spectacles constructed according to a preferred embodiment of the present invention, the temples being shown folded; Fig. 2 is a similar view, with the temples unfolded, or open; Fig. 3 is a fragmentary enlarged view; and Fig. 4 is a side elevation corresponding to Fig. 2.

The illustrated ophthalmic mounting comprises two lens-holding rims 2 and 4 integrally connected together by a bridge 6, and all constituted of non-metallic material. The surface 8 of the bridge is adapted to seat upon a wearer's nose. The rims are each provided with an integral end piece 10 at a point approximately diametrically opposite to the bridge 6. One of the hinge plates 12 of a two-plate hinge is secured to one of the end pieces 10, and one of the hinge plates 14 of another two-plate hinge is secured to the other end piece 10. The two plates 12 and 16, and 14 and 18, respectively, of each hinge are pivoted together about a pivot pin 15 extending through ears 17 of the hinge plates. The other hinge plates 16 and 18 of the hinges are respectively secured to the forward ends of temples 20 and 22, that therefore pivot about the pivot pins.

Ophthalmic mountings as thus far described are old and well known, but the temples of the old mountings are adapted to pivot about their hinges substantially in a plane passing through the end pieces 10 and perpendicular to the plane of the rims 2 and 4. The rearwardly disposed, curved ear hooks 24 of the temples, when folded, therefore project down below the rims 2 and 4. It is impossible to place folded spectacles of this character into a spectacle case unless the case is made wide enough to include not only the rims and the bridge, but the projecting temples, as well. A case of such large size is very inconvenient to carry around, with the result that the spectacles are placed directly in the pocket, without a case, and this causes large breakage.

According to the invention disclosed in the above-described application, the ear hooks 24 are caused to overlie the rims 2 and 4, when the temples are folded, as illustrated in Fig. 1, permitting the use of a spectacle case of moderate dimensions. As the hinge plates are elongated, being provided with substantially parallel walls 36, however, and as these are substantially perpendicular to the pivot pins 15, the hinge plates are disposed at an angle to the line 28 joining the end pieces, detracting from the appearance of the spectacles when the temples are unfolded, particularly when the end pieces 10 project along the line joining the end pieces.

According to the preferred embodiment of the present invention, the ears 17 of the hinge plates 12 and 14 are each obliquely disposed to the line joining the end pieces and to the parallel walls 36. The temples are therefore adapted to swing in planes perpendicular to the paper and passing through the dotted lines 30 and 32, respectively. The intersecting line of the oblique planes passing through the lines 30 and 32 is indicated by the point 34, which is situated farther from the nose-seating portion 8 of the bridge 6 than other portions of the bridge.

Modifications will readily occur to persons skilled in the art, and are intended to be embraced within the appended claims.

What is claimed is:

1. An ophthalmic mounting comprising a lens-holding rim constituted of non-metallic material having an integral end piece, a hinge member having a pivot ear that is obliquely disposed to the line joining the ear and the center of the rim and having substantially parallel walls secured to the end piece with the walls substantially parallel to the line joining the ear and the center of the rim, and a temple pivoted to the ear, whereby the temple is adapted to pivot about the ear in a plane positioned at one side of the center of the rim.

2. An ophthalmic mounting comprising two lens-holding rims and a bridge integrally connecting the lens-holding rims and all constituted of non-metallic material, the rims each having an integral end piece at a point opposite to the bridge and projecting from the said two points substantially along the line joining the said two points, an elongated hinge plate secured to each end piece substantially parallel to the said line joining the end pieces, the hinge plates each having an ear obliquely disposed to the said line joining the end pieces, and a temple pivoted to each ear, whereby the temples are adapted to pivot about the ears in planes oblique to the said line connecting the end pieces.

3. An ophthalmic mounting comprising two lens-holding rims and a bridge integrally connecting the lens-holding rims and all constituted of non-metallic material, the rims each having an integral end piece at a point opposite to the bridge, a hinge plate having substantially parallel walls secured to each end piece with the walls disposed substantially parallel to the line connecting the end pieces, the hinge plates each having an ear obliquely disposed to the said walls, and a temple pivoted to each ear, whereby the temples are adapted to pivot about the ears in planes oblique to the said line connecting the end pieces.

4. An ophthalmic mounting comprising two lens-holding rims and a bridge integrally connecting the lens-holding rims and all constituted of non-metallic material, the bridge having a portion adapted to rest upon the nose of a wearer and the rims each having an integral end piece at a point opposite to the bridge and projecting from the said two points substantially along the line joining the said two points, two hinges each comprising two hinge plates pivoted together, one of the hinge plates of each hinge having substantially parallel walls and being secured to one of the end pieces with the said walls substantially parallel to the said line joining the end pieces, the said parallel-walled hinge plates each having an ear obliquely disposed to the said walls, and two temples each having a forward portion and a rear curved portion, the other hinge plates of each hinge being respectively secured to the forward portions of the temples, whereby the temples are adapted to pivot about the ears in planes oblique to the said line connecting the end pieces, the intersecting line of the said oblique planes being farther from the nose-seating portion of the bridge than from other portions of the bridge, whereby the curved portions of the temples are adapted to overlie the rims when the temples are folded.

In testimony whereof, I have hereunto subscribed my name this 28th day of February, 1924.

ALBERT A. JEANERET.